UNITED STATES PATENT OFFICE.

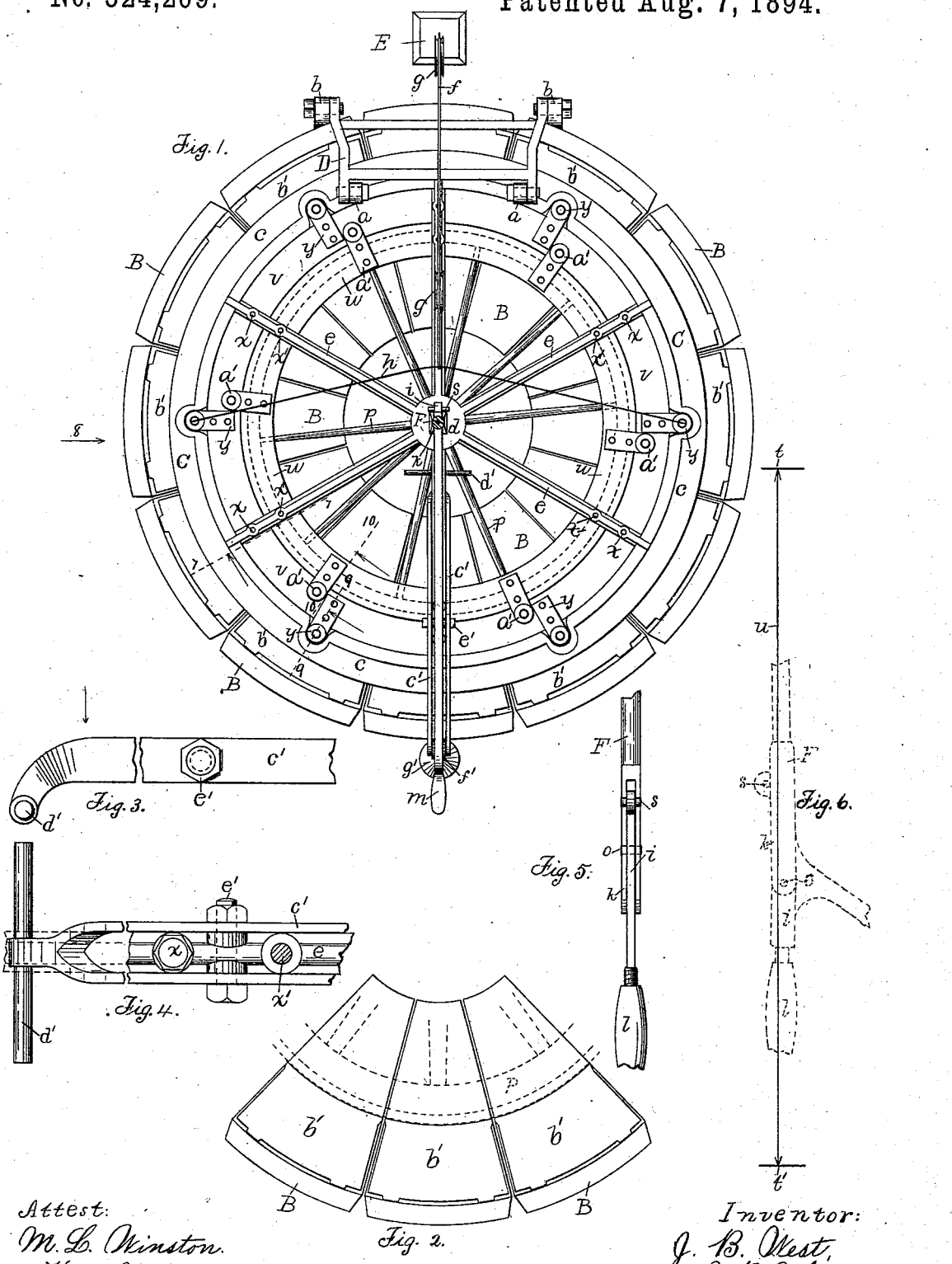

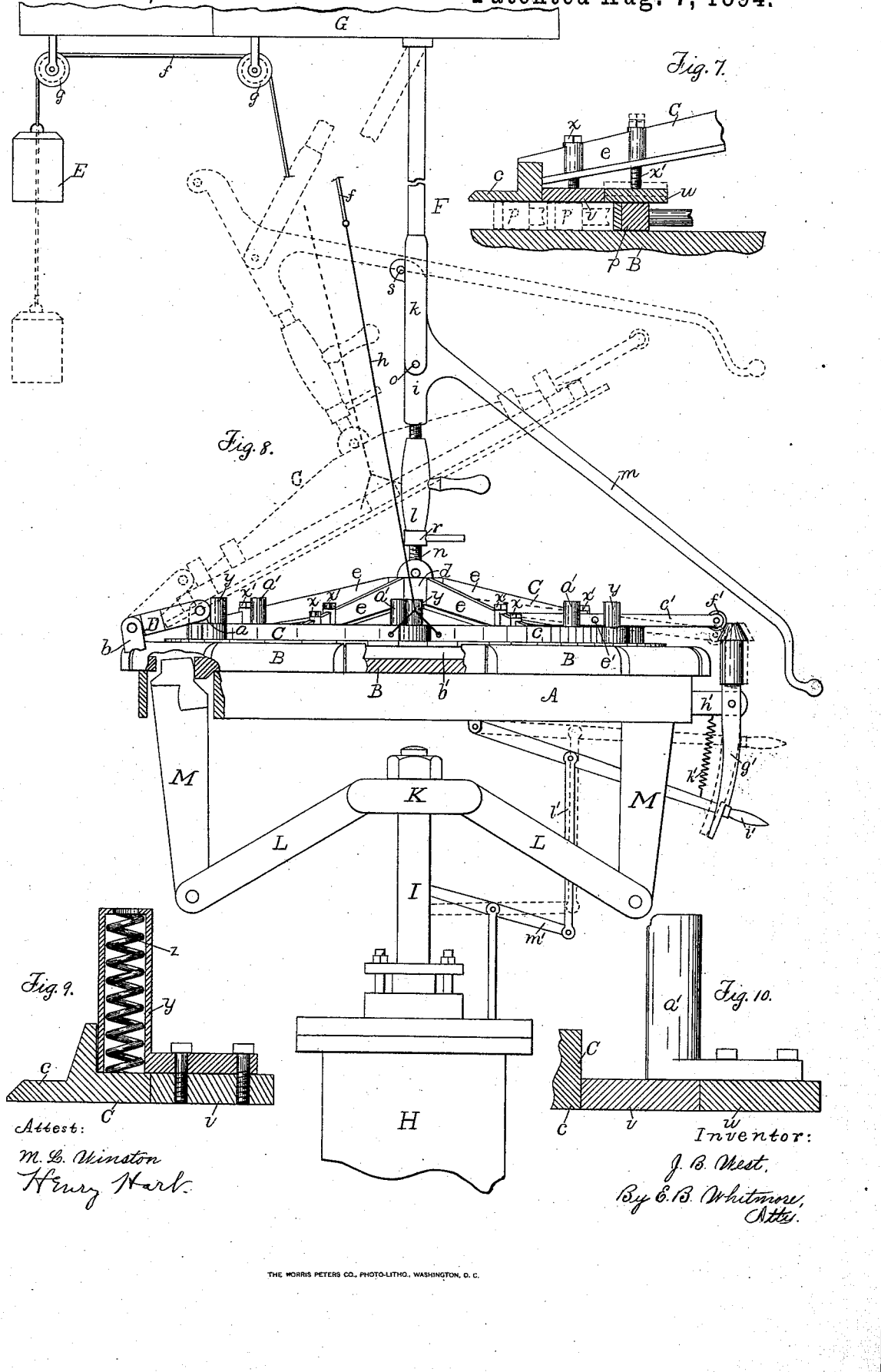

JONATHAN B. WEST, OF ROCHESTER, NEW YORK.

MACHINE FOR SETTING TIRES.

SPECIFICATION forming part of Letters Patent No. 524,269, dated August 7, 1894.

Application filed April 14, 1893. Serial No. 470,384. (No model.)

*To all whom it may concern:*

Be it known that I, JONATHAN B. WEST, of Rochester, in the county of Monroe and State of New York, have invented a new and useful Improvement in Machines for Setting Tires, which improvement is fully set forth in the following specification and shown in the accompanying drawings.

My invention relates to machines for setting wagon tires cold by means of a pressure brought to bear upon the outer convex surface of the tire and so causing the latter to assume a smaller diameter, and thus set firmly upon the felly of the wheel. In these machines the wheel with the tire loosely placed thereon is put in place to receive the pressure; but in most cases the tire and the felly of the wheel are either or both of them more or less warped laterally out of shape, that is to say, frequently neither of these parts is truly in a plane. If, when thus out of shape, the tire be set upon the wheel these imperfections will remain in the wheel and be made permanent and the wheel will thereby be rendered imperfect and objectionable.

In my invention shown and described in Letters Patent No. 444,166, of date January 6, 1891, I produce a device for straightening the tire and the felly; and the object of my present invention is mainly to provide better and more convenient means for bringing the felly and the tire to a true plane before setting the tire.

The invention is hereinafter fully described and more particularly pointed out in the claims.

Referring to the drawings, Figure 1 is a plan of the main parts of a tire-setting machine with my improvements attached in place. Fig. 2 is a plan of some of the sectoral compressing jaws showing the adjacent sectoral dies to press the tire. Fig. 3 is a side elevation of a portion at the inner end of the gage lever. Fig. 4 is a plan of the parts shown in Fig. 3. Fig. 5 is an edge view of parts of the pressing standard. Fig. 6 aids to show the action of said standard. Fig. 7 is a cross section on the line 7.7, in Fig. 1. Fig. 8 is a side elevation of the machine seen as indicated by arrow 8 in Fig. 1, parts being broken away and sectioned and other parts being shown in two positions by full and dotted lines. Fig. 9 is a vertical cross section of some of the parts taken as on the dotted line 9 9 in Fig. 1. Fig. 10 is a vertical cross section of parts taken on the dotted line 10 10 in Fig. 1.

Referring to the parts shown, A is the frame of the tire-setting machine, the form or style of which is not essential to this invention. This frame holds a series of compressing jaws B. These compressing jaws are horizontal, placed radially around a common center, and are in the form of truncated sectors. They serve to receive the wheel and the tire upon their upper surfaces, and in principle and form are substantially like those shown in my former patents, Nos. 444,165, 444,166 and 444,175. My present invention consists in the parts shown above this series of compressing jaws.

Over the series of compressing jaws is a circular spider or presser C, for the wheel, Figs. 1 and 8, raised or crowning at the center and concentric with the compressing jaws. This presser is connected with the frame A by a hinge D, which is connected at one side by movable joints to lugs *a a*, rigid with the presser, and at the other side by movable joints to lugs *b b*, rigid with the frame A. By means of this hinge the presser may assume the elevated position shown by dotted lines in Fig. 8, or be lowered to rest upon the wheel.

The presser consists of an outer circular rim *c*, and a central hub *d*, connected by inclined radial arms *e*. E is a counterweight for the presser, connected with the latter by means of a cord *f*, passing over pulleys *g g*, and a bail *h*. The weight is sufficient, when left to itself, to raise the presser, as shown. By hinging the presser at one side and raising it into the inclined position, it is easier to put a wheel in position and to remove it from the machine, with the same amount of vertical movement of the presser, than would be the case were it raised horizontally. And by using the weight and cord in connection with the hinge, access can be had to the interior of the machine at all points, except at the hinge, as there are no posts nor uprights to interfere.

F is a vertical pressing standard centrally over the presser, with its upper end connected movably to a beam G, or some rigid part overhead, and its lower end forming a pivotal joint with the hub of the presser.

The manner of connecting the standard with the beam G is immaterial care being only taken that the standard may swing freely in a vertical plane, as indicated in Fig. 8. The weight E holds the standard against the beam, and any construction that will prevent a lateral displacement of the upper end of the standard is sufficient, as for instance, causing it to enter a cavity in the beam or in some simple piece made rigid with the beam. The function of the beam is to resist upward thrusts of the standard. As component parts of this standard I provide an intermediate part $i$, pivoted at $o$ between a forked portion $k$, see Fig. 5, a threaded adjusting part or nut $l$, and a threaded part $n$ joined to the presser and entering the nut $l$. The part $i$ is threaded at its lower end to enter the nut $l$, and it is provided with a hand lever $m$, for operating the standard. The parts $i$ and $k$ being pivoted together as stated give to this joint in the standard the nature of a toggle joint, by means of which the presser may be pressed downward with great force upon the wheel $p$ between it and the jaws B.

The threads on the parts $i$ and $n$ are made right and left-hand respectively, by means of which the pressing standard may be slightly shortened or lengthened accordingly as wheels having broader or narrower faces are to be operated upon. The nut $l$ thus serves to regulate the pressure brought by the toggle joint upon the wheel in any given case. I also employ a jam nut $r$, with the nut $l$, by means of which to hold the latter from turning after it has been set in any given case. Thus tires may be set upon any number of wheels uniform in size without changing the nut $l$ after it has been rightly set for one of the wheels.

The multiple jointed hinge D, admits of the lower or working face of the presser adjusting itself accurately to the wheel whatever the width of the face of said wheel and its tire. That is to say, by means of this multiple jointed hinge the presser may always readily assume a position in which its working surface is parallel with the surfaces of the jaws B.

The upper end of the part $i$ is turned backward out of the fork $k$, and provided with a pin $s$, Figs. 5 and 8, to meet the edge of the fork when the hand lever is brought down. This forms a stop for the parts and tends to hold the standard in a position of rigidity. This pin is so placed that the pivotal point $o$ is allowed to slightly pass the center, so that when the pin bears against the fork the whole standard is locked in position and is rigid as to against a longitudinal stress of compression. This will be fully understood by observing Fig. 6. Let $t$ and $t'$ represent the bearing points respectively of the standard against the beam G and the presser. Now the pin $s$ is placed so that when the lever is brought down the pivot $o$ will pass across or slightly forward of the straight line $u$ joining said bearing points $t\ t'$, before said pin encounters the fork. This locks the parts as stated as regards a longitudinal stress of compression and causes the presser to bear against the wheel continuously until the lever is again raised by the operator.

The rim $c$ of the presser I commonly make three or more inches wide, measured horizontally, depending upon the size of the machine; and this rim is designed to act upon wheels of the largest diameters that the machine is capable of operating upon.

To set tires upon wheels less in diameter than the smallest diameter of the rim I employ a series of inner concentric rings $v\ w$, Figs. 1 and 7, which together broaden the working surface of the presser, that is to say, the surface that bears upon the wheel; these rings constituting virtually an inward extension of the rim $c$. These rings are held in place by the following means: Through each one of the arms $e$ of the presser I pass vertical threaded screws $x\ x'$, in position to bear at their lower ends against the middle parts of the rings $v\ w$ respectively. These bearing screws hold the rings firmly as against an upward thrust when the presser is brought down upon the wheel by the lever $m$. To the upper surface of the ring $v$ I secure rigidly a series of spring cages $y$, Figs. 1, 8 and 9. These cages reach over onto the rim $c$, as shown, and are formed with vertical cylindrical parts or barrels containing stout coiled springs $z$, pressing at their lower ends against $c$. I also provide the ring $w$ with similar spring cages $a'$, Figs. 1, 8 and 10, secured rigidly to the ring in position to reach over upon the ring $v$. These cages are provided with springs similar to those shown at $z$, their lower ends bearing upon the ring $v$. The springs $z$ collectively are sufficient to support the weight of the ring $v$ and lift it above the plane of the rim $c$ when the bearing screws $x$ are turned up, to liberate it. Likewise the springs collectively in the cages $a'$ are sufficient to lift the ring $w$ when the bearing screws $x'$ are turned up, as indicated by dotted lines in Fig. 7.

Now, when tires are to be set upon wheels having diameters such that the tires come under the inner ring $w$ both rings are set to the plane of the lower surface of the rim $c$, as shown in Figs. 7 and 10. But should the diameter of the wheels be such that the tires come under the ring $v$, the bearing screws $x'$ are turned up to allow the springs in the cages $a'$ to lift the ring $w$ out of the way. Likewise if the diameter of the wheels is such as to cause the tires to come under the rim $c$, the bearing screws $x$ are turned up as well as the bearing screws $x'$ so that both rings may be lifted out of the way by the respective series of springs.

The cages $y$ and $a'$ projecting over upon the rim $c$ and ring $v$ respectively, form stops which prevent the bearing screws $x$ $x'$ from pressing said rings below the surface of the rim. And these cages with the contained springs also prevent the rings from dropping out of the presser when the latter is raised by the counter-weight.

The rings may at any time be removed from the presser altogether by taking off the various spring cages.

I employ a gage lever $c'$, with the presser, pivoted to one arm thereof, at $e'$, Figs. 1, 3, 4 and 8, which, by means of coacting parts, causes the dishing of the wheel to shut off the power and stop the pressure of the jaws upon the tire much the same as shown in my Patent No. 444,165 above mentioned. This gage lever extends inward to a point near the hub of the wheel and bends at its inner end downward, see Figs. 1, 3 and 4, it being provided with a horizontal arm $d'$, to encounter the spokes when the wheel dishes upward on account of the pressure of the jaws. At its outer end the lever is provided with a roller $f'$, as shown in Figs. 1 and 8.

Below the roller $f'$ is a vertical trip-lever $g'$, having a conical head and pivoted to an arm $h'$, rigid with the frame A. A hand lever $i'$, also pivoted to the frame, coacts with the lever $g'$, and it is controlled by a spring $k'$. This lever is indirectly connected with the valve of the cylinder H by means of a connecting rod $l'$, lever $m'$, and other simple parts fully shown and described in said Patent No. 444,165. The parts between the roller $f'$ and the power cylinder are not by themselves here claimed to be new.

The means for forcing the jaws inward to press the tires onto the wheels is not essential to my present invention. The means, for instance, shown and described in my Patent No. 444,175 above referred to may be employed. In that invention a vertical steam or fluid cylinder H is placed centrally beneath the frame A. This cylinder is provided with a piston rod I, having a head K, to which is joined a series of radial connecting bars L. Each compressing jaw is provided with a pendent lever M, pivoted in the frame A, with its lower end joined to the outer end of one of the connecting bars L. Now, as the connecting bars incline downward from the head K when the jaws are drawn back, a downward movement of the head will force the jaws against the tire of the wheel.

Truncated sectoral dies $b'$, Figs. 1 and 2, having different radial widths, similar to those shown in my Patent No. 444,175, are employed with the compressing jaws to set tires of different diameters.

What I claim as my invention is—

1. In a machine for setting tires, the combination, with a supporting rim, of radially movable compressing jaws and means for operating them, a presser pivotally secured to the support at one side by means of a double jointed hinge, whereby the surface of the presser and the top of the frame will be parallel when in an operating position irrespective of the distance they are apart, a jointed standard above the presser with its lower end in engagement therewith, and means for operating the standard and for swinging the presser upon its hinge, substantially as set forth.

2. In a machine for setting tires, the combination, with a supporting rim, of radially movable compressing jaws and means for operating them, a presser pivotally secured to the support at one side by means of a double jointed hinge, a toggle jointed standard having its lower end in engagement with the presser, and means for adjusting the length of the standard to the thickness of the wheel being operated upon, substantially as set forth.

3. In a machine for setting tires, the combination, with a supporting frame, of radially movable compressing jaws, and means for operating them, a presser pivotally secured to the frame at one side by means of a double jointed hinge, a standard having its lower end secured to the presser, said standard being formed of sections hinged together, one of the sections being provided with a lever for operating the standard and with a right and left hand thread for adjusting its length, and means for removing the presser, substantially as set forth.

4. A tire-setting machine having a supporting frame, and compressing jaws and means to operate the latter, in combination with a circular presser for the tire and the wheel, over the jaws, connected with the frame by a movable joint, and means to operate the presser, internal rings in the plane of the presser, springs to lift the rings, and means to control the action of the springs, substantially as shown and described.

5. A presser for the tire and wheel of a tire-setting machine formed of a circular rim and central hub, with arms connecting the hub and the rim, and internal rings $v$ $w$ concentric with the rim and in the plane of the latter, the outer ring, $v$, being provided with projecting parts to bear upon the rim, and the inner ring, $w$, being provided with projecting parts to bear upon the ring $v$, and bearing screws in the arms of the presser for said rings, substantially as shown and described.

6. In combination with a series of jaws of a tire-setting machine, and means to operate them, a tilting presser for the tire and the wheel, a standard to bear upon the presser, composed of connected parts adapted to swing out of line, a stop to hold said parts substantially in a line, a lever to operate the standard, and means to adjust the standard as to length, substantially as and for the purpose specified.

7. A tire-setting machine having a supporting frame and compressing jaws and means to move the latter, in combination with a presser for the tire and the wheel, and means substantially as shown and described for operating the presser, and a pivoted gage arm held by the presser, substantially as set forth.

In witness whereof I have hereunto set my hand, this 5th day of April, 1893, in the presence of two subscribing witnesses.

JONATHAN B. WEST.

Witnesses:
ENOS B. WHITMORE,
M. L. WINSTON.